2,810,766

SYNTHESIS OF HYDROPEROXIDES FROM GRIGNARD REAGENTS

Cheves Walling, Upper Montclair, N. J., and Sheldon A. Buckler, New York, N. Y., assignors to Heyden Newport Chemical Corporation, a corporation of Delaware No Drawing. Application August 25, 1954, Serial No. 452,224

10 Claims. (Cl. 260—610)

The present invention relates to the synthesis of hydroperoxides, relating more particularly to a method of producing organic hydroperoxides utilizing the addition at comparatively low temperatures of an organic Grignard reagent to a solvent containing oxygen; and relating as well to certain organic hydroperoxides readily producible by this means.

Heretofore, three basic procedures have been employed for the preparation of hydroperoxides, namely:

(1) By the reaction of alkyl halides, sulfonates or sulfates with hydrogen peroxide in the presence of an alkali, (2) By the reaction of tertiary olefins or alcohols with hydrogen peroxide in the presence of an acid, and (3) By the autoxidation of hydrocarbons with molecular oxygen.

All of these known procedures have serious limitations and drawbacks, see Tobolsky and Mesrobian, "Organic Peroxides," Interscience, 1954, which discusses them extensively. Without attempting to review all of these drawbacks herein, suffice it to state that the reactions are often difficult to control, yields are generally low, and special techniques usually must be developed in order to obtain the desired results.

Moreover, each of the above mentioned procedures is limited to the production of a particular type of hydroperoxide. Thus, the procedure numbered (1) above is suitable for primary and secondary alkyl hydroperoxides, that numbered (2) is suitable for tertiary hydroperoxides only and that numbered (3) is suitable for some tertiary and some benzyl type hydroperoxides.

Many hydroperoxides cannot be produced by any of these procedures and have not been successfully synthesized heretofore, although efforts have been made to produce them. For example, several attempts have been made to prepare benzyl hydroperoxide by the autoxidation of toluene without success. Benzyl hydroperoxides would be of considerable interest as an intermediate or "stepping stone" to provide a new route for the production of other compounds.

In fact, isopropylbenzene hydroperoxide produced by the autoxidation of cumene has been utilized to provide an improved means of making phenol, and large plants have been built to carry out this process. In general, the hydroperoxides, especially the aralkyl hydroperoxides, show considerable promise for providing new routes for producing other compounds; and the fact that a wide variety of their alkyl and acyl derivatives may be made readily enhances such possibilities; but the difficulties encountered to date in synthesizing the hydroperoxides have, of course, seriously hampered progress along these lines.

The method of the present invention may be utilized to synthesize the large group of organic hydroperoxides comprising primary, secondary or tertiary alkyl hydroperoxides or aralkyl hydroperoxides, including benzyl hydroperoxide and others which have not been producible by prior methods.

By the present method the hydroperoxide itself may be isolated conveniently so that its alkyl or acyl derivatives may or may not be produced thereafter as preferred. However, such derivatives may also be made directly while practicing our invention without an intermediate isolation step.

The present method is reliable, produces good yields, requires no peculiar technique or equipment and is well adapted for producing hydroperoxides in relatively large quantities so that these interesting compounds may be available, in many cases for the first time, not only as end products but also as promising intermediates.

Briefly, the method of the present invention contemplates addition, preferably slowly, of an organic Grignard reagent of the general formula RMgX (R representing an alkyl or aralkyl group; X representing Cl or Br) to an organic solvent such as diethyl ether containing dissolved molecular oxygen while maintaining a low temperature (0° to −100° C.), thereafter hydrolyzing, separating the organic and aqueous layers, and recovering hydroperoxide (ROOH) from the organic layer as by distilling. Of course, such further steps as additional extraction of the aqueous layer with the organic solvent, drying the latter, cooling and so forth may be utilized, if advisable, in ways well known to a chemist.

It will be observed that the method of the present invention enables the reaction of oxygen with the Grignard reagent to occur with the production of a hydroperoxide. The usual oxidation of Grignard reagents, that is, by the addition of a suitable oxidizing agent to the Grignard reagent rather than the addition of the Grignard reagent to a solvent containing oxygen at low temperatures, produces an alcohol or phenol:

$$2\text{RMgX} + O_2 \longrightarrow 2\text{ROMgX} \xrightarrow{H_2O} 2\text{ROH}$$

The method of the present invention, however, is believed to proceed in accordance with the following chemical equation:

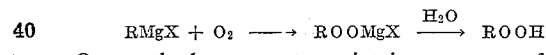

$$\text{RMgX} + O_2 \longrightarrow \text{ROOMgX} \xrightarrow{H_2O} \text{ROOH}$$

Our method appears to maintain an excess of oxygen in the reaction vessel and, as will be noted from the examples provided hereinafter, oxygen may be added to the organic solvent during the reaction. Thus, the Grignard reagent is used up according to the chemical equation given immediately above. In particular, the reaction represented by the following chemical equation is effectively suppressed:

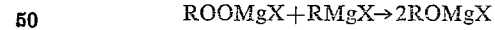

$$\text{ROOMgX} + \text{RMgX} \rightarrow 2\text{ROMgX}$$

Clearly, the latter reaction, if it proceeded to any appreciable extent, might produce other compounds such as a phenol or an alcohol, but not a hydroperoxide.

The following examples show the manner in which the method or process of the present invention may be carried out.

EXAMPLE 1

Tertiarybutylmagnesium chloride in diethyl ether solution is added in the course of 2¾ to 3 hours under the surface of 1.3 volumes of diethyl ether which is cooled to −75° C., continually saturated with oxygen, and agitated throughout. The mixture is allowed to come to room temperature, mixed with 0.5 volume of water and acidified with hydrochloric acid. The organic layer is separated and the aqueous layer is extracted twice with 0.2 volume of diethyl ether, and the combined extracts are dried with calcium chloride. The diethyl ether is removed under reduced pressure and the residue distilled to give a minimum of 82% of teriarybutyl hydroperoxide, B. P. 34/20 mm., $M_D^{27.5}=1.3980$, $d_4^{20}=0.897$, M. P. 0.5=20.0. Anal.: 98% tertiarybutyl hydroperoxide.

The effect on the yield of tertiarybutyl hydroperoxide resulting from varying some of the more important conditions of the procedure of Example 1 is shown in Table I.

Table I

| Run | Normality of Reagent | Temp., °C. | Time of Addition a (min.) | Yield b |
|---|---|---|---|---|
| 1 | 1.62 | −65 | 40 | 34 |
| 2 | 1.62 | −71 | 120 | 78 |
| 3 | .56 | −71 | 40 | 86 |
| 4 | 1.74 | −69 | 70 | 46 |
| 5 | .53 | −74 | 80 | 91 |
| 6 | .53 | −7 | 80 | 28 | a Of 1 volume of reagent to 1 volume of $O_2$ saturated diethyl ether.
b By titration.

EXAMPLE 2

Benzylmagnesium chloride in diethyl ether solution is added in the course of two hours to 2.0 volumes of diethyl ether which is cooled to −75° C., continually saturated with oxygen, and agitated throughout. The mixture is allowed to come to room temperature, and is mixed with 0.5 volume of water. One part of hydrochloric acid is added, and the organic layer is separated. The aqueous layer is extracted two times with 0.5 volume of diethyl ether and the combined extracts are concentrated to 0.4 volume. This concentrated combined extract is then extracted with 0.2 volume of 30% sodium hydroxide solution while cooling in ice. The basic layer is neutralized while cooling in ice and the resulting solution is extracted three times with 0.2 volume of diethyl ether. The combined extracts are dried with calcium chloride and distilled under reduced pressure giving 36.5% of benzyl hydroperoxide, a colorless liquid with B. P. 53.5° C. at 0.09 mm., $n_D^{25}=1.5350$, $d_4^{20}=1.117$.

EXAMPLE 3

A solution of 2-n-octylmagnesium chloride in diethyl ether solution is added to 1.5 volumes of diethyl ether under the conditions described in Examples 1 or 2. The resulting solution is mixed with 0.5 volume of water and 1 part of hydrochloric acid is added. The layers are separated and the aqueous layer is extracted with 0.2 volume of ether. The ether is removed under reduced pressure and the residue distilled to give 80% of 2-n-octyl hydroperoxide, B. P. 58–59° C. at 0.5 mm., $n_D^{25}=1.4269$, $d_4^{20}=0.868$. Anal.: 91%.

EXAMPLE 4

Cyclohexylmagnesium chloride is reacted with oxygen in the manner described for Examples 1, 2 or 3. After mixing with water and neutralizing with hydrochloric acid, the organic layer is separated and the aqueous layer extracted two times with 0.5 volume of diethyl ether. The combined extracts are concentrated to 0.4 volume and extracted with 0.3 volume of 30% sodium hydroxide solution. The basic extracts are neutralized with cooling and extracted three times with 0.3 volume of diethyl ether and the extracts dried with calcium chloride. The ether is removed under reduced pressure and the residue distilled to give 52% of cyclohexyl hydroperoxide, B. P. 42–43° C. at 0.1 mm., $n_D^{25}=1.4638$, $d_4^{20}=1.019$. A similar procedure with cyclohexylmagnesium bromide gives 30% cyclohexyl hydroperoxide.

Our invention is still further exemplified by the data summarized in Table II. The general procedure amply described above was employed. One volume of the Grignard reagent was added at −75° C. to one volume of diethyl ether saturated with oxygen:

Table II

| Reagent | Normality | Yield of Hydroperoxide, percent |
|---|---|---|
| t-amylmagnesium chloride | 0.35 | 92 |
| 2-camphylmagnesium chloride | 0.55 | 90 |
| ethylmagnesium chloride | 0.48 | 57 |
| ethylmagnesium bromide | 0.54 | 28 |

As pointed out above, our invention may be practiced to produce a wide variety of derivatives of the organic hydroperoxides capable of being produced by our method. The hydroperoxides may be isolated and reacted with various alkylating or acylating agents such as alkyl halides, sulfates, or sulfonates and acid halides and anhydrides. However, our invention may also be utilized to prepare such derivatives of the hydroperoxides without necessarily going through an intermediate isolation step.

Examples 5 and 6 below illustrate two typical preparations of derivatives producible according to the present invention, but it will be understood that many other derivatives may also be prepared:

EXAMPLE 5

To the oxidized solution described in Example 1 is added one part of ethyl bromide. The solution is agitated for three hours at 20–30° C., and then allowed to stand for 16 hours at this temperature. The solution is mixed with water, acidified with hydrochloric acid, and the organic layer dried with magnesium sulfate. It is then distilled under reduced pressure to give 22% of ethyl t-butyl peroxide, B. P. 34/84 mm., $n_D^{24}=1.3840$, $d_4^{20}=0.810$.

EXAMPLE 6

To the oxidized solution described in Example 1 is added one part of benzoyl chloride. The solution is agitated for two hours at 20–30° C., and allowed to stand at −20° C. for 16 hours. The solution is mixed with water, acidified with hydrochloric acid, and the organic layer is dried with magnesium sulfate. It is then distilled to give 54% of t-butyl perbenzoate, B. P. 64–65° C. at 0.04 mm., $n_D^{25}=1.4983$, $d_4^{20}=1.048$.

Our invention may be carried out satisfactorily with any Grignard reagent having the structure RMgX; R representing a primary, secondary or tertiary alkyl group, or an aralkyl group in which the —MgX is attached to a side chain, or a cycloparaffin group. X represents either Cl or Br but not I. Cl is preferred.

Unsaturation may be present as may substituents which do not react with the —MgX function. In view of the prominence of Grignard reagents and of the considerable quantity of information concerning them which has been published, a chemist can readily determine which substituents are and which are not permissible for present purposes.

Aromatic Grignard reagents and acetylenic compounds of the type R—C≡C—MgX are not recommended for use in practicing the present invention inasmuch as the former appear to yield phenols and other products, whereas the latter appear to be inert to oxygen under our conditions. It should be noted, however, that the cycloparaffin Grignard reagents mentioned above as being useful in carrying out the present invention are alicyclic in character. Thus, they are cyclic aliphatic compounds and are not aromatic Grignard reagents.

As to the organic solvents employed in connection with our invention, diethyl ether was preferred chiefly because it was convenient. Any organic solvent for but which is inert to the Grignard reagent employed is suitable. For instance, toluene, dioxane or xylene can be utilized.

Low concentrations of the reactants are preferable to provide optimum yields as indicated particularly in Table I, but are not required in order that the reaction may proceed.

Also, the reaction may be conducted between 0° and −100° C.; but our preferred temperature range is −60° C. to −80° C. since distinctly improved yields are obtained if the reaction takes place within this preferred temperature range.

For present purposes the term "hydroperoxide compound" includes either a hydroperoxide producible by our invention or those of its derivatives the nature and production of which has been described hereinbefore, which derivatives, as pointed out above, may be produced readily by practicing our invention.

Our invention is capable of various modifications and it is intended and desired to include within the scope of this invention such modifications and changes that are necessary to adapt it to the varying conditions and uses as defined by the scope of the appended claims.

We claim:

1. A method of producing a hydroperoxide compound selected from the group consisting of organic hydroperoxides and derivatives of organic hydroperoxides comprising providing an organic solvent containing dissolved oxygen, adding to said solvent a Grignard reagent having the structure RMgX, maintaining the temperature of said solvent within the range of about 0° C. to about −100° C. during the reaction between the Grignard reagent and oxygen, reacting the reaction product of the Grignard reagent with oxygen with a material selected from the group consisting of a hydrolyzing agent, a hydrolyzing agent and an alkylating agent, and a hydrolyzing agent and an acylating agent and recovering the hydroperoxide compound; R representing a member of the group consisting of an alkyl group, an aralkyl group and a cycloparaffinic group; X representing a member of the group consisting of Cl and Br; the —MgX of said Grignard reagent being attached to a side chain when R represents an aralkyl group.

2. The method of producing a hydroperoxide compound as claimed in claim 1 in which said material is a hydrolyzing agent and an alkylating agent.

3. The method of producing a hydroperoxide compound as claimed in claim 1 in which said material is a hydrolyzing agent and an alkylating agent and in which the temperature of said solvent is maintained within the range of about −60° C. to about −90° C.

4. A method of producing an organic hydroperoxide comprising providing an organic solvent containing dissolved oxygen, adding to said solvent a Grignard reagent having the structure RMgX, maintaining the temperature of said solvent within the range of about 0° C. to about −100° C. during the reaction between the Grignard reagent and oxygen, hydrolyzing the reaction product of the Grignard reagent with oxygen, and recovering a hydroperoxide; R representing a member of the group consisting of an alkyl group, an aralkyl group and a cycloparaffinic group; X representing a member of the group consisting of Cl and Br; the —MgX of said Grignard reagent being attached to a side chain when R represents an aralkyl group.

5. A method of producing an organic hydroperoxide comprising providing an organic solvent containing dissolved oxygen, slowly adding to said solvent a Grignard reagent having the structure RMgX, maintaining the temperature of said solvent within the range of about −60° C. to about −80° C. during the reaction between the Grignard reagent and oxygen, hydrolyzing the reaction product of the Grignard reagent with oxygen, and recovering a hydroperoxide; R representing a member of the group consisting of an alkyl group, an aralkyl group and a cycloparaffinic group; X representing a member of the group consisting of Cl and Br; the —MgX of said Grignard reagent being attached to a side chain when R represents an aralkyl group.

6. A method of producing an organic hydroperoxide comprising providing an organic solvent, adding to said solvent a Grignard reagent having the structure RMgX, maintaining an excess of molecular oxygen dissolved in said solvent during the reaction between said Grignard reagent and the dissolved oxygen, maintaining the temperature of said solvent within the range of about 0° C. to about −100° C. during said reaction, hydrolyzing the reaction product of the Grignard reagent with oxygen, and recovering a hydroperoxide; R representing a member of the group consisting of an alkyl group, an aralkyl group and a cycloparaffinic group; X representing a member of the group consisting of Cl and Br; the —MgX of said Grignard reagent being attached to a side chain when R represents an aralkyl group.

7. A method of producing tertiarybutyl hydroperoxide comprising selecting a solvent from the group consisting of diethyl ether, toluene, dioxane and xylene, adding tertiarybutylmagnesium chloride to the selected solvent, maintaining said solvent saturated with molecular oxygen during the reaction between the tertiarybutylmagnesium chloride and the dissolved oxygen, during said reaction maintaining a temperature of said solvent within the range of about −60° C. to about −80° C., treating the resulting solution with water acidified with a mineral acid, and thereafter isolating the tertiarybutyl hydroperoxide.

8. A method of producing benzyl hydroperoxide comprising selecting a solvent from the group consisting of diethyl ether, toluene, dioxane and xylene, adding benzylmagnesium chloride to the selected solvent, maintaining said solvent saturated with molecular oxygen during the reaction between the benzylmagnesium chloride and the dissolved oxygen, during said reaction maintaining the temperature of said solvent within the range of about −60° C. to about −80° C., treating the resulting solution with water acidified with a mineral acid, and thereafter isolating the benzyl hydroperoxide.

9. A method of producing 2-n-octyl hydroperoxide comprising selecting a solvent from the group consisting of diethyl ether, toluene, dioxane and xylene, adding 2-n-octylmagnesium chloride to the selected solvent, maintaining said solvent saturated with molecular oxygen during the reaction between the 2-n-octylmagnesium chloride and the dissolved oxygen, during said reaction maintaining the temperature of said solvent within the range of about −60° C. to about −80° C., treating the resulting solution with water acidified with a mineral acid, and thereafter isolating the 2-n-octyl hydroperoxide.

10. A method of producing cyclohexyl hydroperoxide comprising selecting a solvent from the group consisting of diethyl ether, toluene, dioxane and xylene, adding cyclohexylmagnesium chloride to the selected solvent, maintaining said solvent saturated with molecular oxygen during the reaction between the cyclohexyl chloride and the dissolved oxygen, during said reaction maintaining the temperature of said solvent within the range of about −60° C. to about −80° C., treating the resulting solution with water acidified with a mineral acid, and thereafter isolating the cyclohexyl hydroperoxide.

References Cited in the file of this patent

UNITED STATES PATENTS 2,683,751     Filar _____ July 13, 1954

OTHER REFERENCES

Ivanov et al.: Chem. Abstracts, vol. 44 (1950), p. 8316 (1 page).

Walling et al.: Jour. Amer. Chem. Soc., vol. 75 (1953), pp. 4372–3 (2 pages).